Oct. 27, 1942.                A. S. GETTEN                    2,299,973
                          PROJECTOR ATTACHMENTS
                        Filed Nov. 19, 1941           2 Sheets-Sheet 1
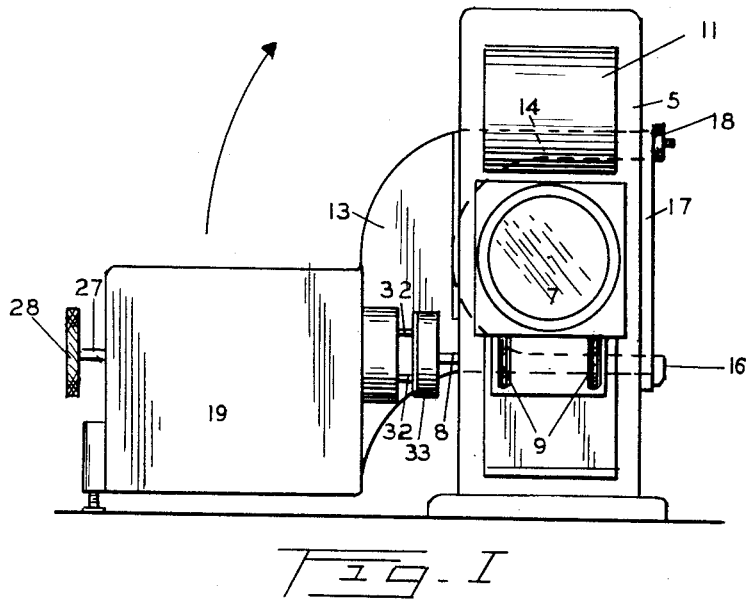
Fig. I
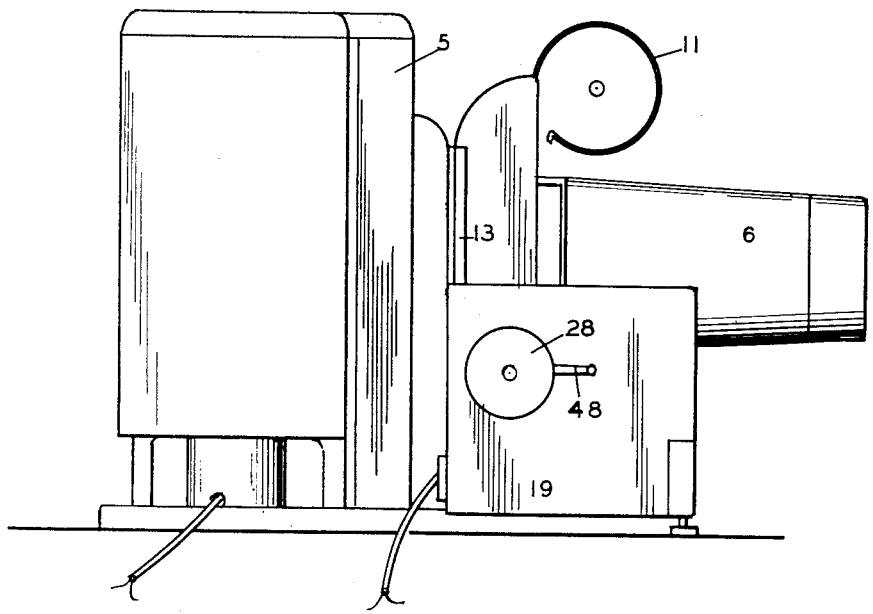
Fig. II
INVENTOR.
ALBERT S. GETTEN
BY Oct. 27, 1942.  A. S. GETTEN  2,299,973
PROJECTOR ATTACHMENTS
Filed Nov. 19, 1941    2 Sheets-Sheet 2
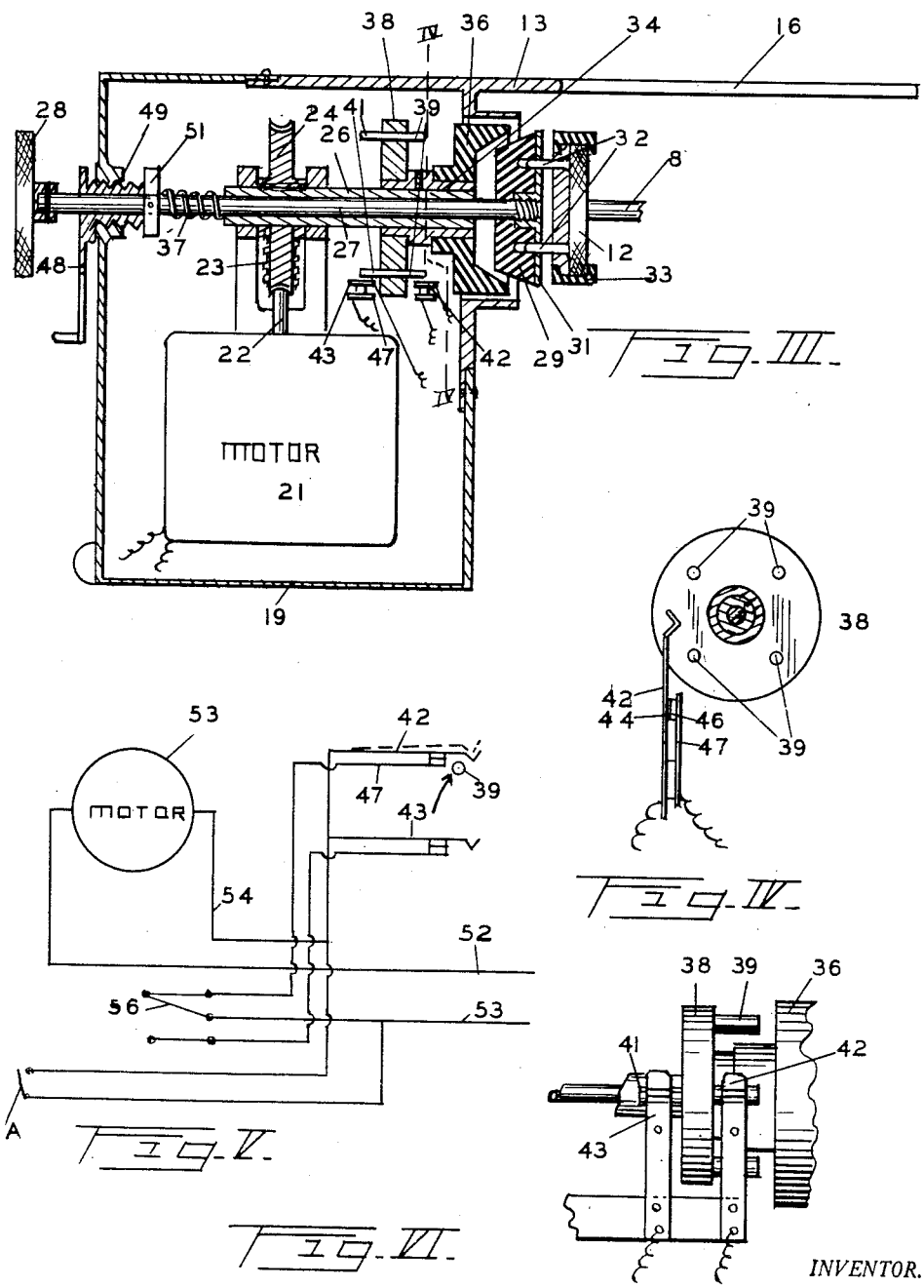
INVENTOR.
ALBERT S. GETTEN Patented Oct. 27, 1942

2,299,973

UNITED STATES PATENT OFFICE 2,299,973

PROJECTOR ATTACHMENTS

Albert S. Getten, San Francisco, Calif.

Application November 19, 1941, Serial No. 419,693

2 Claims. (Cl. 88—28)

This invention relates to improvements in projector attachments and has particular reference to a device for attaching to an ordinary projector whereby the operator of the projector may move the pictures being projected from a remote point.

A further object of the invention is to produce a device of this character which may be employed with films of either single or double frame, and a device which may be used with pictures which are either horizontally or vertically arranged upon the film strip.

A further object of the invention is to provide means whereby the device permits the customary flexibility of the projector in framing the individual pictures of the film strip or advancing the film strip manually to a selected picture.

Other objects and advantages will be apparent during the course of the following description.

In the accompanying drawings forming a part of this specification and in which like numerals are employed to designate like parts throughout the same, Fig. I is a front elevational view of a projector having my invention attached thereto;

Fig. II is a side elevational view of Fig. I;

Fig. III is a top plan view of my device having the casing and driving mechanism shown in cross section;

Fig. IV is a cross sectional view taken on the line IV—IV of Fig. III;

Fig. V is a schematic showing of the wiring; and

Fig. VI is a side elevational view of Fig. IV.

In projecting pictures from a strip of film, commonly termed 35-millimeter motion picture film, it is customary to thread the film from a position above the light source and lens down between the light source and lens past a pair of rotatable sprockets which engage the perforations on the film. Therefore, when these sprockets are turned, the film is moved downward so as to present the pictures on the film in succession.

A projector film feeding mechanism consists of a shaft upon which the sprockets are secured and a clutch mechanism which, when released by a slight endwise movement of the shaft, permits the picture on the film to be framed or, in other words, moved into proper alignment between the light source and the lens. The rotation of this shaft, after the framing has been accomplished, is such that a pressure plate is moved away from the film during its travel and then against the film while being projected.

My device consists of a motor driven arrangement which will permit all the manual functions of the projector as well as permitting the rotation of the projector shaft at will and from a remote point.

In the accompanying drawings wherein for the purpose of illustration is shown a preferred embodiment of my invention, the numeral 5 designates the projector as a whole, which projector has a light source therein adapted to shine through a barrel 6 on which is mounted a lens 7. A shaft 8 has sprockets 9 mounted thereon, which sprockets are adapted to engage a film strip fed downwardly between the light source and the lens from a holder 11. This shaft 8 has a knurled wheel 12 whereby the same may be manually rotated for the purpose of advancing the film through the rotation of the sprockets 9.

My invention consists of a device which is attached to the projector through the medium of a bracket 13 having an upper and a lower arm 14 and 16, respectively, which encircle a portion of the projector and are held thereagainst by a pressure plate 17 hooked to the lower arm 16 and held to the upper arm 14 by a thumb screw 18. This bracket 13 supports a housing 19 within which is mounted a motor 21, which is adapted to drive a shaft 22 and a worm 23 which meshes with a worm gear 24 mounted upon a tubular shaft 26, which is in turn mounted upon a freely rotatable shaft 27. This shaft is so arranged that it is in substantially axial alignment with the shaft 8 and has a knurled hand-wheel 28 through the medium of which the same may be manually rotated, the purpose of which will be later seen.

Mounted upon the opposite end of the shaft 27 from the hand-wheel 28 is a rubber cone 29 which carries a plate 31 having openings therein which are adapted to receive pins 32 carried by a rubber cup 33 which is adapted to be slipped over the knurled wheel 12. The shaft 26 has secured thereto through the medium of a bushing 34 a rubber clutch member 36 against which the cone 29 is adapted to be normally held by the spring 37. The bushing 34 also has mounted thereon a disc 38 which has pins 39 upon one side thereof and pins 41 on the opposite side thereof. The pins 39 are adapted to engage a spring finger 42, and the pins 41 are adapted to engage a spring finger 43. Each of the spring fingers 42 and 43 carries a contact 44 which are adapted to be moved away from contacts 46 upon arms 47, the purpose of which will be later seen.

In order to move the shaft 27 endwise just sufficiently to release the clutch member 36 and the cone 29, I provide an arm 48 which is threadedly engaged, as shown at 49, to the housing 19 and bears against a collar 51. When the parts are in the position shown in Fig. III, the clutch and the cone will be disengaged.

Referring to Fig. V, the current enters through the wire 52 to the motor 53, thence by a wire 54 to the spring fingers 42 and 43. Assuming that the switch arm 56 is in the position shown, then current will move through the contacts beneath the spring finger 42 to the arm 47, through the switch 56 and back to the opposite side of the line 53. Thus the motor will run until one of the pins 39 moves against the spring finger 42, moving the same to the dotted line position in the upper portion of Fig. V. As the current will now be interrupted, the motor will stop. (I might here state that an instant stopping motor is employed so that the parts are always in the proper position to function.)

In order to start the motor again, the operator at a remote point closes the switch A, which will bridge the open contacts, thus supplying current to the motor. As soon as the pin 39 moves from beneath the spring finger 42, the normal circuit will be restored to the motor and the same will function until the next successive pin interrupts the circuit.

The operation of my device is as follows:

Assuming that the parts have been arranged as shown and the device has been attached to a projector, the operator feeds the film into the projector in the customary manner. He now moves the arm 48 a sufficient distance to separate the cone 29 and the clutch 36, after which the hand-wheel 28 may be rotated, thus rotating the shaft 8 so that the picture on the film will be properly framed in the projector. As soon as the framing takes place, the arm 48 is moved to its retracted position, the spring 37 functions to pull the cone into engagement with the clutch, and the parts are ready to function. Then the operator may press the switch A and the motor will turn the parts a predetermined distance depending upon whether it is a single framed picture or a double framed picture. If it is a single framed picture, then the operator actuates the switch 56 so that the pins 39 are the ones which separate the contacts; and if it is a double framed picture, then the pins 41 will be the ones which will operate the contacts. Thus it will be apparent that the motor in one case will function only a predetermined distance, and in the second case the motor will function to drive the parts a distance twice that for a single framed picture.

As indicated by the arrow in Fig. I, it will be apparent that the device may be swung to a vertical position so as to provide for pictures which are vertically arranged upon the film, as is some times the case.

It is to be understood that the form of my invention herewith shown and described is to be taken as a preferred example of the same and that various changes relative to the material, size, shape and arrangement of parts may be resorted to without departing from the spirit of the invention or the scope of the subjoined claims.

Having thus described my invention, I claim:

1. In combination with a projector having a film feeding mechanism consisting of a shaft and a hand-wheel, a bracket secured to said projector and supporting a second shaft in axial alignment with said first-mentioned shaft, motor means for rotating said second-mentioned shaft, means for connecting said second-mentioned shaft to said first-mentioned shaft, remote means for controlling said motor, and an interrupter rotated by said second-mentioned shaft and adapted to stop said motor at predetermined intervals.

2. In combination with a projector having a film feeing mechanism and comprising a shaft, sprockets mounted thereon and a hand-wheel, of a bracket secured to said projector and supporting a casing, a shaft rotatably supported in said casing and in axial alignment with said first-mentioned shaft, flexible coupling means between said first-mentioned and said second-mentioned shafts, said coupling means including a resilient cone, a clutch mounted on and rotatable by said second-mentioned shaft and adapted to be moved longitudinally into engagement with said cone, means for manually moving said second-mentioned shaft longitudinally to disengage said cone from said clutch, motor means for rotating said second-mentioned shaft, a disc rotated by said second-mentioned shaft, pins carried by said disc adapted to separate contacts, whereby current to said motor may be interrupted, and remote means for bridging said contacts whereby said motor will be actuated.

ALBERT S. GETTEN.